(12) United States Patent
Du

(10) Patent No.: US 10,275,051 B2
(45) Date of Patent: Apr. 30, 2019

(54) INTERACTION METHOD, INTERACTION DEVICE, AND OPERATION STICK

(71) Applicant: Beijing Zhigu Rui Tuo Tech Co., Ltd., Beijing (CN)

(72) Inventor: Lin Du, Beijing (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 39 days.

(21) Appl. No.: 15/398,312

(22) Filed: Jan. 4, 2017

(65) Prior Publication Data

US 2017/0199589 A1 Jul. 13, 2017

(30) Foreign Application Priority Data

Jan. 8, 2016 (CN) .......................... 2016 1 0012489

(51) Int. Cl.
| | | |
|---|---|---|
| *G06F 3/033* | (2013.01) | |
| *G06F 3/0354* | (2013.01) | |
| *G06F 3/038* | (2013.01) | |
| *G06T 19/00* | (2011.01) | |
| *G06F 3/01* | (2006.01) | |
| *G06F 3/0481* | (2013.01) | |

(52) U.S. Cl.
CPC .......... *G06F 3/03545* (2013.01); *G06F 3/016* (2013.01); *G06F 3/0383* (2013.01); *G06F 3/04815* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2012/0206419 A1* | 8/2012 | Lee ........................ | G06F 3/012 |
| | | | 345/179 |
| 2013/0021288 A1 | 1/2013 | Karkkainen | |
| 2017/0100664 A1* | 4/2017 | Osterhout ............... | A63F 13/24 |
| 2017/0102791 A1* | 4/2017 | Hosenpud ........... | G06F 3/03545 |

FOREIGN PATENT DOCUMENTS

| | | |
|---|---|---|
| CN | 102508562 A | 6/2012 |
| CN | 102508563 A | 6/2012 |
| CN | 102822784 A | 12/2012 |
| CN | 103744518 A | 4/2014 |

\* cited by examiner

*Primary Examiner* — Adam R. Giesy
(74) *Attorney, Agent, or Firm* — Sheppard Mullin Richter & Hampton LLP

(57) ABSTRACT

Embodiments of the present application provide an interaction method, an interaction device, and an operation stick. The interaction method comprises: determining a height of an input position in three-dimensional display content, where the input position is selected by a user by controlling contact between an operation stick and an operation panel by using a partial limb; and controlling a physical property of a first part between a first position in the operation stick and a first contact part at least according to the height, where the operation stick is in contact with the operation panel in the first position, and is in contact with the partial limb at the first contact part, and the physical property is a property that can affect a straight-line distance between the first position and the first contact part. Embodiments of the present application provide a solution for mixed reality (MR) interaction.

42 Claims, 7 Drawing Sheets

INTERACTION METHOD, INTERACTION DEVICE, AND OPERATION STICK

CROSS REFERENCE TO RELATED APPLICATION

The present application is based on and claims the benefit of priority to Chinese Application No. 201610012489.3, filed on Jan. 8, 2016, the entire contents of which are incorporated herein by reference.

TECHNICAL FIELD

Embodiments of the present application relate to the field of mixed reality (MR) technologies, and in particular, to an interaction method, an interaction device, and an operation stick.

BACKGROUND

An MR technology is mainly to combine a real world and a virtual world to produce a new visualized environment, and covers a virtual reality (VR) technology, an augmented reality (AR) technology, and the like.

In MR applications, a user may interact with a visualized environment in multiple manners. Specifically, common input manners provided by MR applications to users comprise: keyboard input, mouse input, gesture input, label input, input based on an inertial measurement unit (IMU), and the like. These input manners have respective advantages and disadvantages. For example, keyboard input and mouse input are mature and inexpensive but are not intuitive enough, gesture input is convenient but is not precise enough, label input is inexpensive but has excessively simple functions, and input based on an IMU has insufficient positioning precision, and the like.

SUMMARY

In view of this, an objective of the embodiments of the present application is to provide a solution for MR interaction.

To implement the foregoing objective, according to a first aspect of an embodiment of the present application, an interaction method is provided, and comprises:

determining a height of an input position in three-dimensional display content, where the input position is selected by a user by controlling contact between an operation stick and an operation panel by using a partial limb; and controlling a physical property of a first part between a first position in the operation stick and a first contact part at least according to the height, where the operation stick is in contact with the operation panel in the first position, and is in contact with the partial limb at the first contact part.

To implement the foregoing objective, according to a second aspect of the embodiments of the present application, an interaction device is provided, and comprises:

a first determining module, configured to determine a height of an input position in three-dimensional display content, where the input position is selected by a user by controlling contact between an operation stick and an operation panel by using a partial limb; and a first control module, configured to control a physical property of a first part between a first position in the operation stick and a first contact part at least according to the height, where the operation stick is in contact with the operation panel in the first position, and is in contact with the partial limb at the first contact part.

To implement the foregoing objective, according to a third aspect of an embodiment of the present application, an interaction device is provided, and comprises:

a communication interface, configured to communicate with at least one MR display device and an operation stick;

a memory, configured to store an instruction; and a processor, configured to execute the instruction stored in the memory, where the instruction causes the processor to execute the following operations:

determining a height of an input position in three-dimensional display content displayed by the at least one MR display device, where the input position is selected by a user by controlling contact between the operation stick and an operation panel by using a partial limb; and sending a control instruction to the operation stick at least according to the height, where the control instruction is used to control a physical property of a first part between a first position in the operation stick and a first contact part, and the operation stick is in contact with the operation panel in the first position, and is in contact with the partial limb at the first contact part.

To implement the foregoing objective, according to a fourth aspect of an embodiment of the present application, an operation stick is provided, and comprises:

a mechanical part, at least partially located between an end of the operation stick and a first contact part, where the end is used to be in contact with an operation panel, the first contact part is used to be in contact with a partial limb of a user, and a physical property of the mechanical part is controllable;

a communication interface, configured to communicate with at least one MR display device;

a memory, configured to store an instruction; and a processor, configured to execute the instruction stored in the memory, where the instruction causes the processor to execute the following operations:

determining a height of an input position in three-dimensional display content displayed by the at least one MR display device, where the input position is selected by the user by controlling contact between the end and the operation panel by using the partial limb; and controlling the physical property of the mechanical part at least according to the height.

To implement the foregoing objective, according to a fifth aspect of an embodiment of the present application, an operation stick is provided, and comprises:

a mechanical part, at least partially located between an end of the operation stick and a first contact part, where the end is used to be in contact with an operation panel, the first contact part is used to be in contact with a partial limb of a user, and a physical property of the mechanical part is controllable;

a communication interface, configured to receive a control instruction; and a controller, configured to control the physical property of the mechanical part according to the control instruction.

At least one of the multiple technical solutions above has the following beneficial effects:

In the embodiments of the present application, a height of an input position in three-dimensional display content is determined, where the input position is selected by a user by controlling contact between an operation stick and an operation panel by using a partial limb, and a physical property of a first part between a first position in the operation stick and a first contact part is at least controlled according to the height, where the operation stick is in contact with the operation panel in the first position, and is in contact with the partial limb at the first contact part, thereby providing a solution for MR interaction.

DETAILED DESCRIPTION

The specific implementing manners of the present application are further described below in detail with reference to the accompanying drawings and embodiments. The embodiments below are used for describing the present invention rather than to limit the scope of the present invention.

Figure 1:
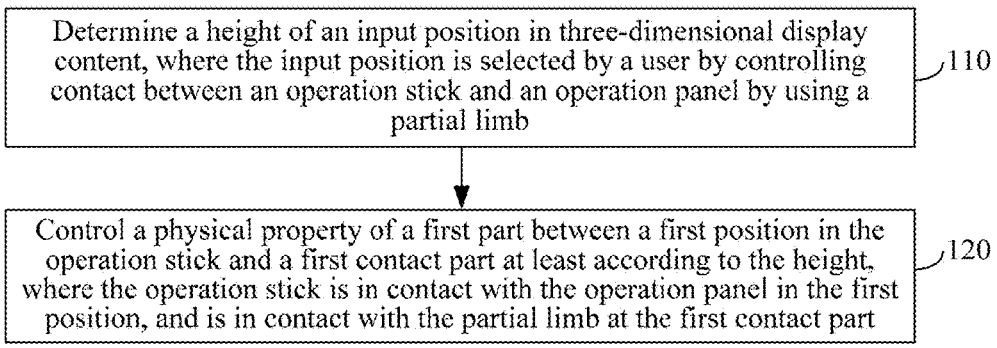
FIG. 1 is a schematic flowchart of an embodiment of an interaction method provided in the present application.

FIG. 1 is a schematic structural diagram of an embodiment of an interaction method provided in the present application. As shown in FIG. 1, this embodiment comprises:

110: Determine a height of an input position in three-dimensional display content, where the input position is selected by a user by controlling contact between an operation stick and an operation panel by using a partial limb.

For example, the interaction device of Embodiment 1 or Embodiment 2 of an interaction device provided in the present application, or, the operation stick of Embodiment 1 of an operation stick provided in the present application is used as an execution subject in this embodiment and executes 110 and 120.

In this embodiment, the three-dimensional display content is usually displayed by at least one display device to the user. The at least one display device is optionally at least one MR display device. For example, the three-dimensional display content is projected by an MR helmet worn by the user in front of the user.

In this embodiment, the input position is optionally a position where the user is to perform input. That is, the user may need to perform an operation on partial content, which is in the input position, of the three-dimensional display content. For example, the user may set a color, change a shape, and the like.

In this embodiment, the partial limb may be any partial limb of the user, for example, a hand of the user.

In this embodiment, the operation stick may be a stick-shaped object made of any material. The stick-shaped object may be straight or approximately straight, or, at least partially curved. Optionally, the operation stick is easy for the user to hold. Optionally, an end of the operation stick is pointy, that is, similar to a pen form.

In this embodiment, the operation panel may be made of any material, and the operation panel is optionally formed of at least one surface of an operation platform. Specifically, the operation panel is optionally a flat surface or a curved surface.

In this embodiment, MR space comprises real space and display space, where a real object exists in the real space, and a virtual object seen by the user exists in the display space. Further, in the display space, in addition to the three-dimensional display content, a first display object corresponding to the operation stick and a second display object corresponding to the partial limb usually further exist. Specifically, the three-dimensional display content, the first display object, and the second display object all exist in the display space, whereas the partial limb, the operation stick, and the operation panel all exist in the real space. The first display object is a representation, in the display space, of the operation stick in the real space, and the first display object is an "operation stick", that is, a virtual operation stick, seen by the user. A display appearance of the first display object is optionally related to a real appearance of the operation stick, or, a display appearance of the first display object is unrelated to a real appearance of the operation stick. For example, the first display object is a standard display object given by an operation stick object template. The second display object is a representation, in the display space, of the partial limb in the real space. The second display object is a "partial limb", that is, a virtual partial limb, seen by the user. A display appearance of the second display object is optionally related to a real appearance of the partial limb, or, a display appearance of the second display object is unrelated to a real appearance of the partial limb. For example, the second display object is a standard display object given by a limb object template. Generally speaking, the first display object and the second display object in the display space provide the user with a visual perception. The visual perception is that the user is controlling the first display object by using the second display object to select an input position and perform input. In addition, a representation corresponding to the operation panel optionally further exists in the display space. That is, the user may further see an "operation panel", that is, a virtual operation panel. When a representation corresponding to the operation panel exists in the display space, the representation corresponding to the operation panel in the display space is referred to as a third display object. A display appearance of the third display object is optionally related to a real appearance of the operation panel. For example, the operation panel is a flat surface and the third display object is also a flat surface. Alternatively, a display appearance of the third display object is unrelated to a real appearance of the operation panel. For example, the operation panel is a curved surface and the third display object is a flat surface. When a representation corresponding to the operation panel does not exist in the display space, it means that the user cannot see an "operation panel".

In this embodiment, for clear description, the operation stick, the partial limb, and the operation panel refer to an operation stick, a partial limb, and an operation panel in the real space respectively, that is, a real operation stick, a real partial limb, and a real operation panel. The "operation stick", the "partial limb", and the "operation panel" refer to an operation stick, a partial limb, and an operation panel in the display space respectively, which are equivalent to a virtual operation stick, a virtual partial limb, and a virtual operation panel.

In this embodiment, the input position may be any position in the three-dimensional display content.

In this embodiment, the height of the input position may usually be represented by a relative height of an operation position corresponding to the input position relative to the operation panel, where the operation position is mapping, in the real space, of the input position in the display space. Further, from the perspective of the visual perception of the user, the operation position may be higher than the operation panel or lower than the operation panel or level with the operation panel. For example, the partial limb is used as a reference, and when the operation position and the partial limb are located on a same side of the operation panel, the operation position is higher than the operation panel, and correspondingly, the height is a positive value. When the operation position and the partial limb are located on different sides of the operation panel, the operation position is lower than the operation panel, and correspondingly, the height is a negative value. When the operation position is located on the operation panel, the height is zero.

120: Control a physical property of a first part between a first position in the operation stick and a first contact part at least according to the height, where the operation stick is in contact with the operation panel in the first position, and is in contact with the partial limb at the first contact part.

In this embodiment, the physical property of the first part can affect a straight-line distance between the first position and the first contact part. Optionally, the physical property comprises but not limited to at least one of the following: a physical length and a physical curvature. For example, when the physical curvature of the first part is controlled to stay unchanged while the physical length is controlled to decrease in 120, the straight-line distance between the first position and the first contact part usually decreases. When the physical curvature of the first part is controlled to increase and the physical length is controlled to stay unchanged in 120, the straight-line distance between the first position and the first contact part usually also decreases. When the physical curvature of the first part is controlled to decrease and the physical length is controlled to increase in 120, the straight-line distance between the first position and the first contact part usually increases. It should be noted that when the first part is straight, the straight-line distance between the first position and the first contact part is usually equal to the physical length of the first part, and when the first part at least is partially curved, the straight-line distance between the first position and the first contact part is usually less than the physical length of the first part.

In this embodiment, to perform input, the user usually needs to keep contact between the operation stick and the operation panel. Correspondingly, when the straight-line distance between the first position and the first contact part on the operation stick decreases, the user controls the partial limb that is in contact with the operation stick at the first contact part to move in a direction approaching the operation panel, which is equivalent to that the user lowers the partial limb, to enable the operation stick to be still in contact with the operation panel. When the straight-line distance between the first position and the first contact part increases, because the operation stick is in contact with the operation panel in the first position, the operation panel gives a force feedback on the partial limb by using the operation stick, and the force feedback causes the partial limb that is in contact with the operation stick at the first contact part to move in a direction away from the operation panel, which is equivalent to that the user raises the partial limb.

In this embodiment, that a physical property of a first part is controlled at least according to the height means that the height affects the physical property of the first part.

In this embodiment, a height of an input position in three-dimensional display content is determined, where the input position is selected by a user by controlling contact between an operation stick and an operation panel by using a partial limb, and a physical property of a first part between a first position in the operation stick and a first contact part is controlled at least according to the height, where the operation stick is in contact with the operation panel in the first position, and is in contact with the partial limb at the first contact part, thereby providing a solution for MR interaction. Moreover, in a process in which the user controls the contact between the operation stick and the operation panel by using the partial limb to select input positions at different heights in the three-dimensional display content, the physical property of the first part is controlled at least according to the height of the input position, which can provide the user with a feeling that the operation stick rises and drops in the input positions at the different heights, thereby providing the user with a more realistic MR experience.

The method in this embodiment is further described below by using some optional implementing manners.

In this embodiment, the height of the input position may be a height of the input position in any direction, that is, the height is a relative height, relative to the operation panel in any direction, of an operation position, mapped in the real space, of the input position.

Figure 2A:
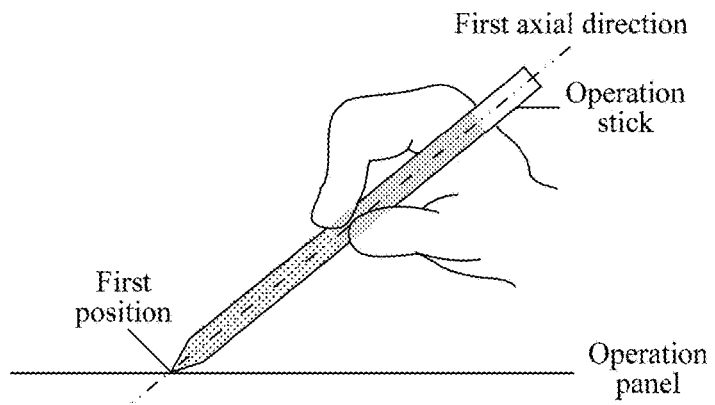
FIG. 2A and FIG. 2B are respectively schematic diagrams in a first axial direction.
Figure 2B:
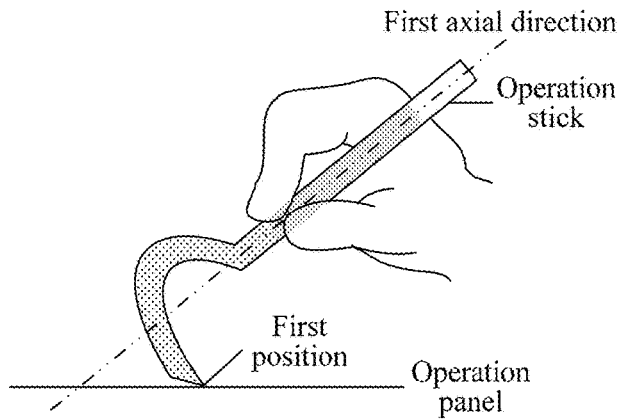

In a possible scenario, the height is a relative height of the operation position relative to the operation panel in a first axial direction, and the first axial direction is an axial direction of the first contact part on the operation stick. FIG. 2A and FIG. 2B are respectively schematic diagrams in the first axial direction. As shown in FIG. 2A, the operation stick is basically straight, the first contact part is a gray area in the operation stick, the first part is an area filled with circular dots in the operation stick, the first axial direction is shown by a dotted line in FIG. 2A, and the first axial direction passes through the first position. As shown in FIG. 2B, the first contact part is a gray area in the operation stick, the first part is an area filled with circular dots in the operation stick, the first axial direction is shown by a dotted line in FIG. 2B, the first part between the first position and the first contact part is partially curved, and it may be seen that the first axial direction does not pass through the first position.

Figure 3A:
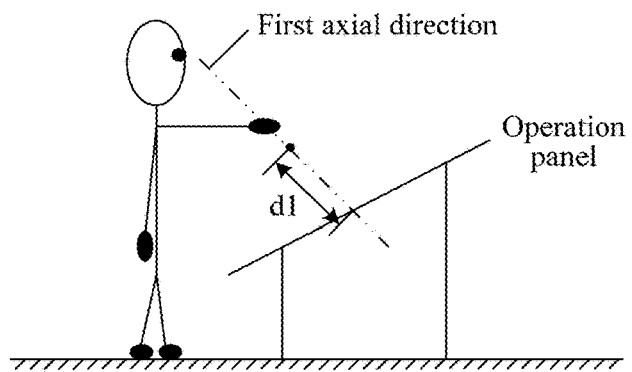
FIG. 3A to FIG. 3C are respectively schematic diagrams of relationships among an operation position, an operation panel, and a first axial direction.
Figure 3B:
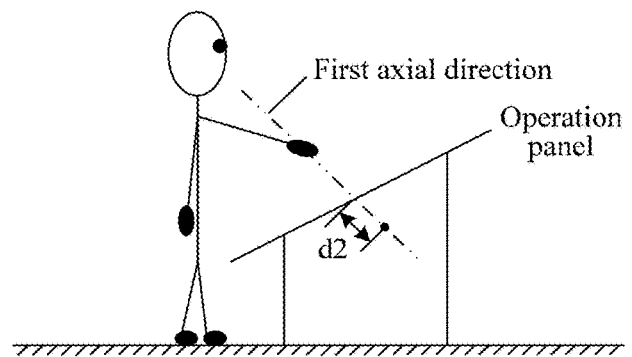
Figure 3C:
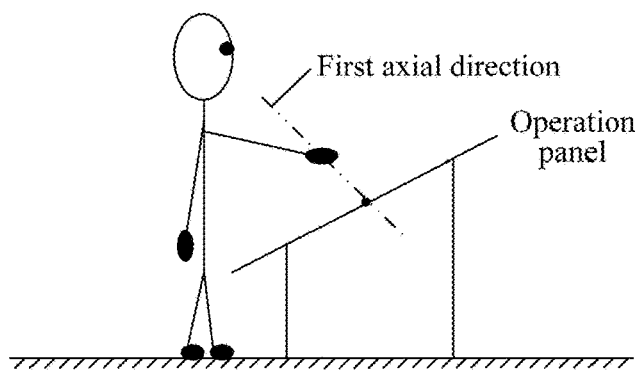

FIG. 3A to FIG. 3C are respectively schematic diagrams of relationships among an operation position, an operation panel, and a first axial direction. As shown in FIG. 3a, the operation position is shown by circular dots in FIG. 3A and is higher than the operation panel, a distance from the operation position to the operation panel in the first axial direction is denoted by d1, and correspondingly, a relative height, relative to the operation panel, of the operation position in the first axial direction is d1, that is, the height of the input position is d1. As shown in FIG. 3B, the operation position is shown by circular dots in FIG. 3B and is lower than the operation panel, a distance from the operation position to the operation panel in the first axial direction is denoted by d2, and correspondingly, a relative height, relative to the operation panel, of the operation position in the first axial direction is −d2, that is, the height of the input position is −d2. As shown in FIG. 3C, the operation position is shown by circular dots in FIG. 3C and is on the operation panel, and correspondingly, a relative height, relative to the operation panel, of the operation position in the first axial direction is 0, that is, the height of the input position is 0. It should be noted that to clearly reflect the relationship among the operation position, the operation panel, and the first axial direction, a diagram of an operation stick is omitted in FIG. 3A to FIG. 3C.

In this embodiment, 120 has multiple implementing manners.

In an optional implementing manner, the controlling a physical property of a first part between a first position in the operation stick and a first contact part at least according to the height comprises:

determining a target distance between the partial limb and the operation panel in the first axial direction at least according to the height; and controlling the physical property of the first part at least according to the target distance.

That is, when a distance between the partial limb and the operation panel in the first axial direction is the target distance, the user feels that the partial limb is in a position corresponding to the height.

The target distance is usually positively related to the height, that is, when the height is larger, the determined target distance is larger, and when the height is smaller, the determined target distance is smaller. Optionally, the height and the target distance have a linear relationship. Optionally, $D=n*H+m$, where D denotes the target distance, H denotes the height, and m and n are constants respectively. For example, if n=1 centimeter and m=5 centimeters, when the height is 5 centimeters, it is determined that the target distance is 10 centimeters, and when the height is −2 centimeters, it is determined that the target distance is 3 centimeters. For another example, if n=0.5 centimeter and m=2 centimeters, when the height is 5 centimeters, it is determined that the target distance is 4.5 centimeters, and when the height is −2 centimeters, it is determined that the target distance is 1 centimeter.

An objective of the controlling the physical property of the first part at least according to the target distance is that in a process in which the user controls the operation stick and the operation panel to stay in contact by using contact with the operation stick at the first contact part, the physical property of the first part can cause the distance between the partial limb and the operation panel in the first axial direction to reach or basically reach the target distance.

In another optional implementing manner, the controlling a physical property of a first part between a first position in the operation stick and a first contact part at least according to the height comprises:

in response to that the height increases, controlling the physical length of the first part to increase and/or controlling the physical curvature of the first part to decrease; and in response to that the height decreases, controlling the physical length of the first part to decrease and/or controlling the physical curvature of the first part to increase.

That the height increases means that a height of a current input position is greater than a height of a previous input position. That the height decreases means that a height of a current input position is less than a height of a previous input position. Specifically, the current input position is an input position when the method in this embodiment is executed a current time, and the previous input position is an input position when the method in this embodiment is executed a previous time.

Specifically, when the physical length of the first part is controlled to increase and/or the physical curvature of the first part is controlled to decrease, the straight-line distance between the first position and the first contact part increases, and a force feedback of the operation panel causes the partial limb to move in a direction away from the operation panel, to cause the user to raise the partial limb. A feeling of such a change of a limb position matches a visual perception as the user sees that a height of an input position increases. When the physical length of the first part is controlled to decrease and/or the physical curvature of the first part is controlled to increase, the straight-line distance between the first position and the first contact part decreases. To keep contact between the operation stick and the operation panel, the user controls the partial limb to move in a direction approaching the operation panel, which is equivalent to that the user lowers the partial limb. A feeling of such a change of a limb position matches a visual perception as the user sees that a height of an input position decreases.

It should be noted that the foregoing two implementing manners of 120 provide further details of 120 from different perspectives, and may be combined. In the foregoing first optional implementing manner of 120, optionally, the controlling the physical property of the first part at least according to the target distance comprises:

in response to that the target distance increases, controlling the physical length of the first part to increase and/or controlling the physical curvature of the first part to decrease; and in response to that the target distance decreases, controlling the physical length of the first part to decrease and/or controlling the physical curvature of the first part to increase.

There are multiple optional implementing manners of how to control variations of the physical length or the physical curvature of the first part. For example, when a mechanical structure whose length is variable and a micromotor configured to control the length of the mechanical structure are disposed in the first part, the execution subject in this embodiment may control the micromotor to control the physical length of the first part. For another example, when at least one part of the first part is made of a material whose deformation is controllable, the execution subject in this embodiment may control a shape of the at least part to control the physical length and/or the physical curvature of the first part. For another example, when at least one part of the first part is made of a material whose elasticity coefficient is controllable, the execution subject in this embodiment may control an elasticity coefficient of the at least part to control the physical length and/or the physical curvature of the first part.

In this embodiment, before 110, the method generally further comprises: determining the input position. Further, there are multiple manners of determining the input position.

In an optional implementing manner, the determining the input position comprises:

determining a three-dimensional area, mapped in the real space, of the three-dimensional display content at least according to the three-dimensional display content and a space mapping relationship between the real space and display space; and determining that the input position is a display position, mapped in the display space, of a first intersection position between the first axial direction and the three-dimensional area in the real space.

The space mapping relationship is a mapping relationship between a first spatial coordinate system of the real space and a second spatial coordinate system of the display space. The space mapping relationship ensures that positions in the real space correspond to positions in the display space one by one. Correspondingly, the determining a three-dimensional area, mapped in the real space, of the three-dimensional display content is specifically: determining a mapped three-dimensional area in the real space of a position of the three-dimensional display content in the display space.

The first axial direction and the three-dimensional area usually have at least one intersection. Further, the determining a three-dimensional area, mapped in the real space, of the three-dimensional display content at least according to the three-dimensional display content and a space mapping relationship between the real space and display space is specifically: determining, at least according to a current operation surface of the three-dimensional display content and the space mapping relationship, a mapped surface area in the real space of the current operation surface. Correspondingly, the determining that the input position is a display position, mapped in the display space, of a first intersection position between the first axial direction and the three-dimensional area in the real space is specifically: determining that the input position is a mapped display position in the display space of the first intersection position between the first axial direction and the surface area in the real space. The current operation surface is selected by the user, and may be an outermost surface or an internal surface of the three-dimensional display content.

In this implementing manner, optionally, this embodiment further comprises:

in response to that contact between the operation stick and the operation panel starts, calibrating the space mapping relationship.

There may be multiple manners of determining whether the operation stick is in contact with the operation panel. For example, some sensors, for example, a light emitter and a light receiver may be disposed in the operation stick, so that it is determined according to data sensed by these sensors whether the operation stick is in contact with the operation panel. For another example, video monitoring may be performed on the real space where the operation panel and the operation stick are located, and it is determined according to an image analysis result of a monitoring picture whether the operation stick is in contact with the operation panel.

That the contact between the operation stick and the operation panel starts means that the operation stick and the operation panel come into contact from no contact.

The calibrating the space mapping relationship may be specifically: determining a transform matrix from the first spatial coordinate system of the real space to the second spatial coordinate system of the display space. Specifically, the transform matrix denotes a transform manner from the first spatial coordinate system to the second spatial coordinate system. The transform manner comprises but not limited to at least one of the following: translation, scaling, and rotation.

It should be noted that at the same time when the space mapping relationship is calibrated, optionally, a relationship between the height and the target distance, also referred to as a height-distance relationship, in the foregoing implementing manner of 120 is further calibrated. For example, when contact between the operation stick and the operation panel starts, the space mapping relationship is calibrated, and at the same time a current height of the current input position and a current distance between the partial limb and the operation panel in the first axial direction are determined. Next, a first variation range of the distance between the partial limb and the operation panel in the first axial direction in a process in which the user selects different input positions is estimated at least according to a variable range of a straight-line length between the first position on the operation stick and the first contact part and a state of the operation panel, and a second variation range of heights in input positions in the three-dimensional display content is determined. Finally, the height-distance relationship is calibrated at least according to the current height, the current distance, the first variation range, and the second variation range.

In another optional implementing manner, the determining the input position comprises:

determining that the input position is a second intersection position between a second axial direction and the three-dimensional display content in display space, where the second axial direction is an axial direction of a second contact part that is on a first display object and is in contact with a second display object.

The second axial direction is usually a direction, mapped in the display space, of the first axial direction in the real space.

The second axial direction and the three-dimensional display content usually have at least one intersection, and the second axial direction and any surface of the three-dimensional display content usually have only one intersection. Further, the determining that the input position is a second intersection position between a second axial direction and the three-dimensional display content in display space is specifically: determining that the input position is a second intersection position between the second axial direction and the current operation surface of the three-dimensional display content in the display space. The current operation surface is selected by the user and may be an outermost surface or an internal surface of the three-dimensional display content.

In this embodiment, when the physical property of the first part changes, a real appearance of the first part usually also changes; however, such a change does not need to be visually perceptible to the user.

In an optional implementing manner, this embodiment further comprises:

controlling a display appearance of a second part between a second position in the first display object corresponding to the operation stick and the second contact part to stay unchanged, where the first display object is in contact with the three-dimensional display content in the second position, and is in contact with the second display object at the second contact part.

In the second spatial coordinate system of the display space, the coordinate values of the second position and the input position are the same or close.

The display appearance comprises but not limited to: an apparent length and an apparent curvature. For example, when in 120, the physical length of the first part is controlled to cause the physical length of the first part to change, in this implementing manner, the display appearance of the second part is controlled to stay unchanged, that is, both the apparent length and the apparent curvature of the second part are at least controlled to stay unchanged. That is, regardless of how an appearance of a real operation stick changes with the physical property of the first part, an appearance of an "operation stick" seen by the user stays unchanged.

As compared with that contact between the operation stick and the operation panel in the first position and contact between the operation stick and the partial limb at the first contact part are both contact in the real space, that is, real contact, contact between the first display object and the three-dimensional display content in the second position and contact between the first display object and the second display object at the second contact part are both contact in the display space, and may be seen as virtual contact.

In this implementing manner, optionally, the method further comprises: controlling relative contact between the first display object and the second display object to stay unchanged. That is, relative movement does not occur between the second display object and the first display object in the display space, and the second display object stays in contact with a same part of the first display object, that is, the second contact part stays unchanged.

Figure 4:
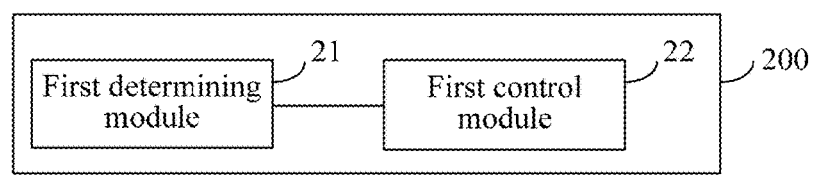
FIG. 4 is a schematic structural diagram of Embodiment 1 of an interaction device provided in the present application.

FIG. 4 is a schematic structural diagram of Embodiment 1 of an interaction device provided in the present application. As shown in FIG. 4, an interaction device 200 comprises:

a first determining module 21, configured to determine a height of an input position in three-dimensional display content, where the input position is selected by a user by controlling contact between an operation stick and an operation panel by using a partial limb; and a first control module 22, configured to control a physical property of a first part between a first position in the operation stick and a first contact part at least according to the height, where the operation stick is in contact with the operation panel in the first position, and is in contact with the partial limb at the first contact part.

In this embodiment, the three-dimensional display content is usually displayed by at least one display device to the user. The at least one display device is optionally at least one MR display device. For example, the three-dimensional display content is projected by an MR helmet worn by the user in front of the user.

In this embodiment, the input position is optionally a position where the user is to perform input. That is, the user may need to perform an operation on partial content, which is in the input position, of the three-dimensional display content. For example, the user may set a color, change a shape, and the like.

In this embodiment, the partial limb may be any partial limb of the user, for example, a hand of the user.

In this embodiment, the operation stick may be a stick-shaped object made of any material. The stick-shaped object may be straight or approximately straight, or, at least partially curved. Optionally, the operation stick is easy for the user to hold. Optionally, an end of the operation stick is pointy, that is, similar to a pen form.

In this embodiment, the operation panel may be made of any material, and the operation panel is optionally formed of at least one surface of an operation platform. Specifically, the operation panel is optionally a flat surface or a curved surface.

In this embodiment, MR space comprises real space and display space, where a real object exists in the real space, and a virtual object seen by the user exists in the display space. Further, in the display space, in addition to the three-dimensional display content, a first display object corresponding to the operation stick and a second display object corresponding to the partial limb usually further exist.

Specifically, the three-dimensional display content, the first display object, and the second display object all exist in the display space, whereas the partial limb, the operation stick, and the operation panel all exist in the real space. The first display object is a representation, in the display space, of the operation stick in the real space, and the first display object is an "operation stick", that is, a virtual operation stick, seen by the user. A display appearance of the first display object is optionally similar to a real appearance of the operation stick, or, a display appearance of the first display object is unrelated to a real appearance of the operation stick. For example, the first display object is a standard display object given by an operation stick object template. The second display object is a representation, in the display space, of the partial limb in the real space. The second display object is a "partial limb", that is, a virtual partial limb, seen by the user. A display appearance of the second display object is optionally similar to a real appearance of the partial limb, or, a display appearance of the second display object is unrelated to a real appearance of the partial limb. For example, the second display object is a standard display object given by a limb object template. Generally speaking, the first display object and the second display object in the display space provide the user with a visual perception. The visual perception is that the user is controlling the first display object by using the second display object to select an input position and perform input. In addition, a representation corresponding to the operation panel optionally further exists in the display space. That is, the user may further see an "operation panel", that is, a virtual operation panel. When a representation corresponding to the operation panel exists in the display space, the representation corresponding to the operation panel in the display space is referred to as a third display object. A display appearance of the third display object is optionally related to a real appearance of the operation panel. For example, the operation panel is a flat surface and the third display object is also a flat surface. Alternatively, a display appearance of the third display object is unrelated to a real appearance of the operation panel. For example, the operation panel is a curved surface and the third display object is a flat surface. When a representation corresponding to the operation panel does not exist in the display space, it means that the user cannot see an "operation panel".

In this embodiment, for clear description, the operation stick, the partial limb, and the operation panel refer to an operation stick, a partial limb, and an operation panel in the real space respectively, that is, a real operation stick, a real partial limb, and a real operation panel. The "operation stick", the "partial limb", and the "operation panel" refer to an operation stick, a partial limb, and an operation panel in the display space respectively, which are equivalent to a virtual operation stick, a virtual partial limb, and a virtual operation panel.

In this embodiment, the input position may be any position in the three-dimensional display content.

In this embodiment, the height of the input position may usually be represented by a relative height of an operation position corresponding to the input position relative to the operation panel, where the operation position is mapping, in the real space, of the input position in the display space. Further, from the perspective of the visual perception of the user, the operation position may be higher than the operation panel or lower than the operation panel or level with the operation panel. For example, the partial limb is used as a reference, and when the operation position and the partial limb are located on a same side of the operation panel, the operation position is higher than the operation panel, and correspondingly, the height is a positive value. When the operation position and the partial limb are located on different sides of the operation panel, the operation position is lower than the operation panel, and correspondingly, the height is a negative value. When the operation position is located on the operation panel, the height is zero.

In this embodiment, the physical property of the first part can affect a straight-line distance between the first position and the first contact part. Optionally, the physical property comprises but not limited to at least one of the following: a physical length and a physical curvature. For example, when the first control module 22 controls the physical curvature of the first part to stay unchanged and controls the physical length to decrease, the straight-line distance between the first position and the first contact part usually decreases. When the first control module 22 controls the physical curvature of the first part to increase and controls the physical length to stay unchanged, the straight-line distance between the first position and the first contact part usually also decreases. When the first control module 22 controls the physical curvature of the first part to decrease and the physical length to increase, the straight-line distance between the first position and the first contact part usually increases. It should be noted that when the first part is straight, the straight-line distance between the first position and the first contact part is usually equal to the physical length of the first part, and when the first part at least is partially curved, the straight-line distance between the first position and the first contact part is usually less than the physical length of the first part.

In this embodiment, to perform input, the user usually needs to keep contact between the operation stick and the operation panel. Correspondingly, when the straight-line distance between the first position and the first contact part on the operation stick decreases, the user controls the partial limb that is in contact with the operation stick at the first contact part to move in a direction approaching the operation panel, which is equivalent to that the user lowers the partial limb, to enable the operation stick to be still in contact with the operation panel. When the straight-line distance between the first position and the first contact part increases, because the operation stick is in contact with the operation panel in the first position, the operation panel gives a force feedback on the partial limb by using the operation stick, and the force feedback causes the partial limb that is in contact with the operation stick at the first contact part to move in a direction away from the operation panel, which is equivalent to that the user raises the partial limb.

In this embodiment, that the first control module 22 controls the physical property of the first part at least according to the height means that the height affects the physical property of the first part.

The interaction device in this embodiment determines a height of an input position in three-dimensional display content by using the first determining module, where the input position is selected by a user by controlling contact between an operation stick and an operation panel by using a partial limb, and the first control module controls a physical property of a first part between a first position in the operation stick and a first contact part at least according to the height, where the operation stick is in contact with the operation panel in the first position, and is in contact with the partial limb at the first contact part, thereby providing a solution for MR interaction. Moreover, in a process in which the user controls the contact between the operation stick and the operation panel by using the partial limb to select input positions at different heights in the three-dimensional display content, the physical property of the first part is controlled at least according to the height of the input position, which can provide the user with a feeling that the operation stick rises and drops in the input positions at the different heights, thereby providing the user with a more realistic MR experience.

The interaction device in this embodiment is further described below by using some optional implementing manners.

In this embodiment, the height of the input position may be a height of the input position in any direction, that is, the height is a relative height, relative to the operation panel in any direction, of an operation position, mapped in the real space, of the input position.

In a possible scenario, the height is a relative height of the operation position relative to the operation panel in a first axial direction, and the first axial direction is an axial direction of the first contact part on the operation stick.

FIG. 2A and FIG. 2B are respectively schematic diagrams in the first axial direction. For related description, reference is made to corresponding parts in the embodiment of the interaction method provided in the present application, and details are no longer described herein.

FIG. 3A to FIG. 3C are respectively schematic diagrams of relationships among an operation position, an operation panel, and a first axial direction. For related description, reference is made to corresponding parts in the embodiment of the interaction method provided in the present application, and details are no longer described herein.

In this embodiment, the first control module 22 has multiple implementing manners.

Figure 5:
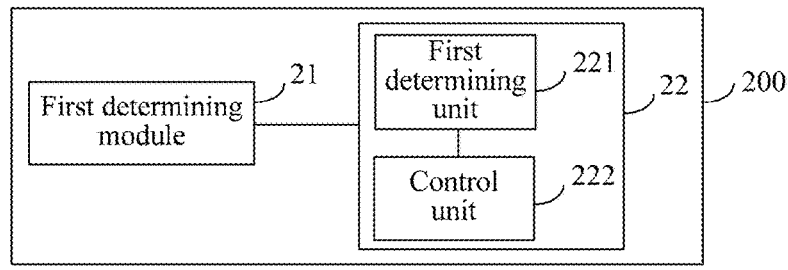
FIG. 5 to FIG. 10 are respectively schematic structural diagrams of implementing manners of the embodiment in FIG. 4.

In an optional implementing manner, as shown in FIG. 5, the first control module 22 comprises:

a first determining unit 221, configured to determine a target distance between the partial limb and the operation panel in the first axial direction at least according to the height; and a control unit 222, configured to control the physical property of the first part at least according to the target distance.

In another optional implementing manner, the first control module 22 is specifically configured to:

in response to that the height increases, control the physical length of the first part to increase and/or control the physical curvature of the first part to decrease; and in response to that the height decreases, control the physical length of the first part to decrease and/or control the physical curvature of the first part to increase.

It should be noted that the foregoing two implementing manners of the first control module 22 provide further details of the first control module 22 from different perspectives, and may be combined. In the foregoing first optional implementing manner of the first control module 22, the control unit 222 is specifically configured to:

in response to that the target distance increases, control the physical length of the first part to increase and/or control the physical curvature of the first part to decrease; and in response to that the target distance decreases, control the physical length of the first part to decrease and/or control the physical curvature of the first part to increase.

Figure 6:
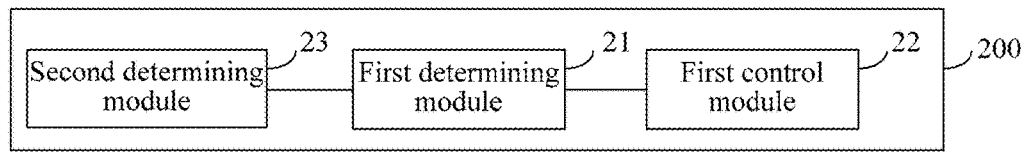

In this embodiment, as shown in FIG. 6, the interaction device 200 generally further comprises:

a second determining module 23, configured to determine the input position.

Specifically, the second determining module 23 has multiple implementing manners.

Figure 7:
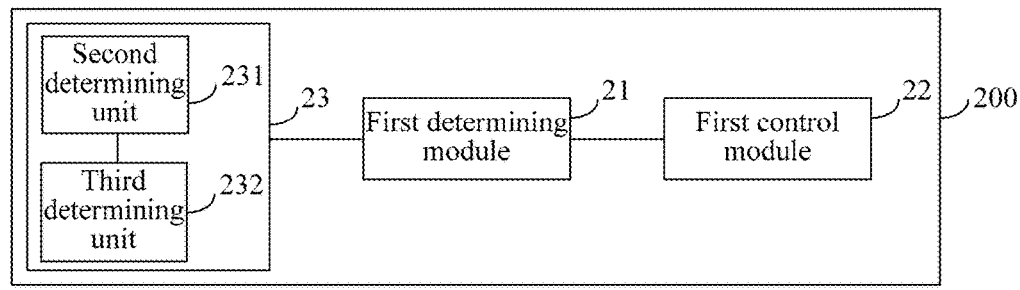

In an optional implementing manner, as shown in FIG. 7, the second determining module 23 comprises:

a second determining unit 231, configured to determine a three-dimensional area, mapped in the real space, of the three-dimensional display content at least according to the three-dimensional display content and a space mapping relationship between the real space and display space; and a third determining unit 232, configured to determine that the input position is a display position, mapped in the display space, of a first intersection position between the first axial direction and the three-dimensional area in the real space.

Figure 8:
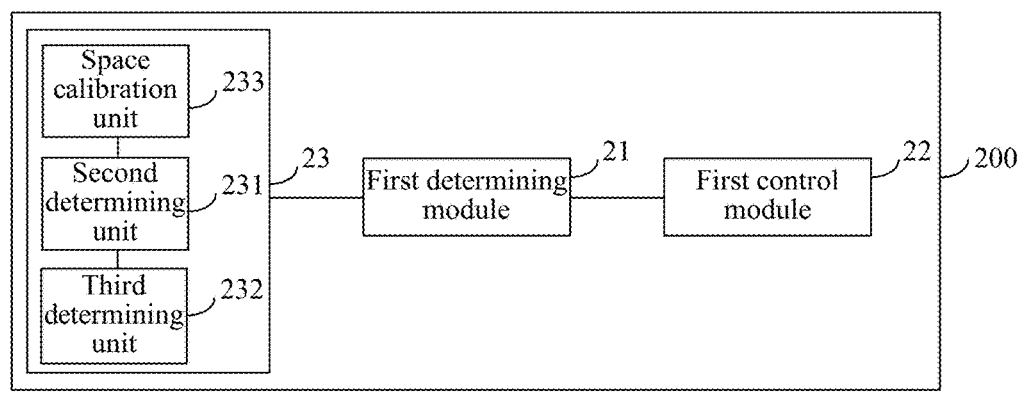

In this implementing manner, optionally, as shown in FIG. 8, the second determining module 23 further comprises:

a space calibration unit 233, configured to: in response to that contact between the operation stick and an operation surface starts, calibrate the space mapping relationship.

Figure 9:
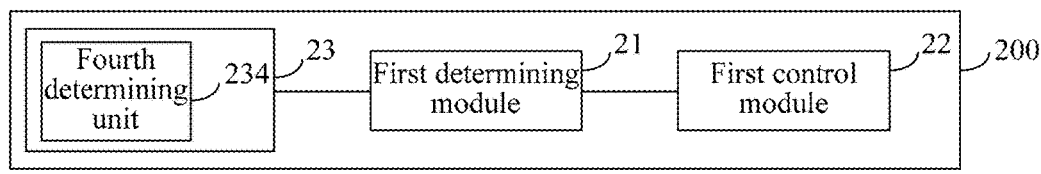

In another optional implementing manner, as shown in FIG. 9, the second determining module 23 comprises:

a fourth determining unit 234, configured to determine that the input position is a second intersection position between a second axial direction and the three-dimensional display content in display space, where the second axial direction is an axial direction of a second contact part that is on a first display object and is in contact with a second display object corresponding to the partial limb.

In this embodiment, when the physical property of the first part changes, a real appearance of the first part usually also changes; however, such a change does not need to be visually perceptible to the user.

Figure 10:
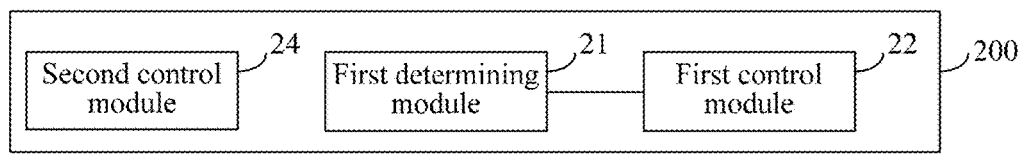

In an optional implementing manner, as shown in FIG. 10, the interaction device 200 further comprises:

a second control module 24, configured to control a display appearance of a second part between a second position in the first display object corresponding to the operation stick and the second contact part to stay unchanged, where the first display object is in contact with the three-dimensional display content in the second position, and is in contact with the second display object corresponding to the partial limb at the second contact part.

The display appearance comprises but not limited to: an apparent length and an apparent curvature.

In any implementing manner in this embodiment, for specific description of any scenario, reference may be made to corresponding parts in the embodiment of the interaction method provided in the present application.

Figure 11:
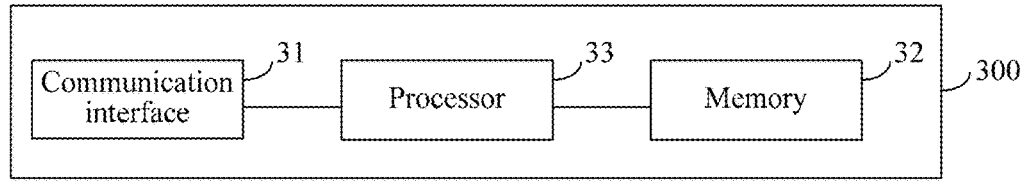
FIG. 11 is a schematic structural diagram of Embodiment 2 of an interaction device provided in the present application.

FIG. 11 is a schematic structural diagram of Embodiment 2 of an interaction device provided in the present application. As shown in FIG. 11, an interaction device 300 comprises:

a communication interface 31, configured to communicate with at least one MR display device and an operation stick;

a memory 32, configured to store an instruction; and a processor 33, configured to execute the instruction stored in the memory 32, where the instruction causes the processor 33 to execute the following operations:

determining a height of an input position in three-dimensional display content displayed by the at least one MR display device, where the input position is selected by a user by controlling contact between the operation stick and an operation panel by using a partial limb; and sending a control instruction to the operation stick at least according to the height, where the control instruction is used to control a physical property of a first part between a first position in the operation stick and a first contact part, where the operation stick is in contact with the operation panel in the first position, and is in contact with the partial limb at the first contact part.

In this embodiment, the communication interface 31 may communicate with the at least one MR display device and the operation stick by using any communication technology. For example, the communication interface 31 communicates with the at least one MR display device by using a wired communication technology, and communicates with the operation stick by using a wireless communication technology.

In this embodiment, the memory 32 optionally comprises a high-speed random-access memory (RAM), and optionally further comprises a non-volatile memory, for example, at least one magnetic disk memory.

In this embodiment, the instruction is optionally stored in the memory 32 in the form of a program.

In this embodiment, the processor 33 may be a central processing unit (CPU), or an application specific integrated circuit (ASIC), or may be configured as one or more integrated circuits that execute the foregoing operations. For the foregoing operation that the instruction causes the processor 33 to execute, reference may be made to the corresponding description of the foregoing embodiment of the interaction method, and a difference lies in only that: the operation of "sending a control instruction to the operation stick at least according to the height, where the control instruction is used to control a physical property of a first part between a first position in the operation stick and a first contact part" executed by the processor 33 in this embodiment is equivalent to 120 in the embodiment of the foregoing interaction method, which is specifically: at least according to the height, controlling the physical property of the first part on the operation stick by sending a control instruction to the operation stick.

Figure 12:
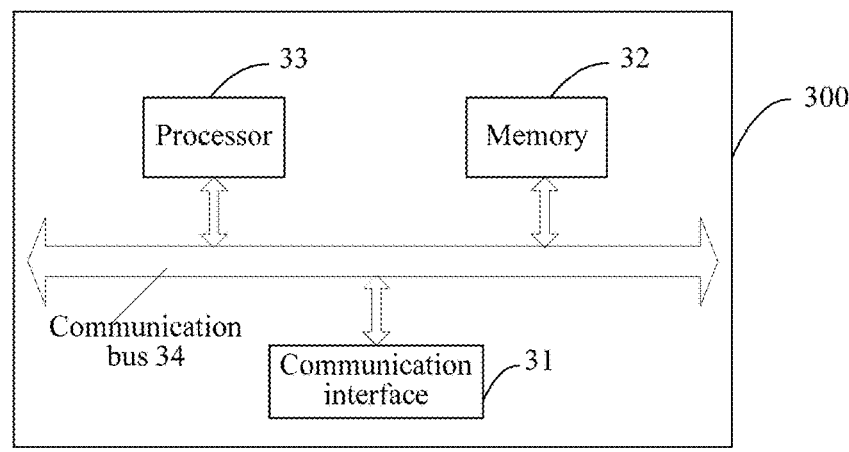
FIG. 12 and FIG. 13 are respectively schematic structural diagrams of implementing manners of the embodiment shown in FIG. 11.

In this embodiment, communication and control between modules or units in the interaction device 300 is optionally implemented by using a communication bus. In an optional implementing manner, as shown in FIG. 12, the interaction device 300 further comprises: a communication bus 34. The communication interface 31, the memory 32, and the processor 33 accomplish communication and control between each other by using the communication bus 34.

In this embodiment, the processor 33 determines the height of the input position in multiple manners.

Figure 13:
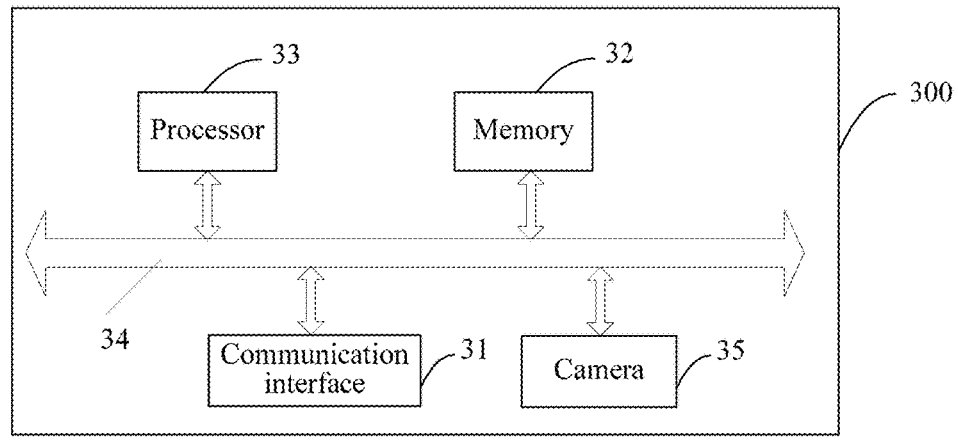

In an optional implementing manner, as shown in FIG. 13, the interaction device 300 further comprises: a camera 35, configured to acquire at least one monitoring image of the operation stick and the operation panel; and the instruction causes the processor 33 to further execute the following operation:

determining the input position at least according to the three-dimensional display content and the at least one monitoring image.

The camera 35 is optionally disposed together with the at least one MR display device. For example, when the at least one MR display device is an MR helmet, the camera 35 may be disposed on the MR helmet.

The at least one monitoring image at least discloses a relative location relationship between the operation stick and the operation panel, for example, whether the operation stick is in contact with the operation panel, and a spatial attitude of the operation stick, for example, an axial direction of the first contact part.

In another optional implementing manner, the at least one MR display device or the operation stick determines the height of the input position, encapsulates the height of the input position in a message, and sends the message to the processor 33 by using the communication interface 31. That is, the processor 33 determines the height of the input position by parsing the received message by using the communication interface 31.

In this embodiment, the interaction device 300 is optionally disposed integrally with the at least one MR display device, or, is integrally disposed with the operation stick, or, is disposed separately from the at least one MR display device and the operation stick.

Figure 14:
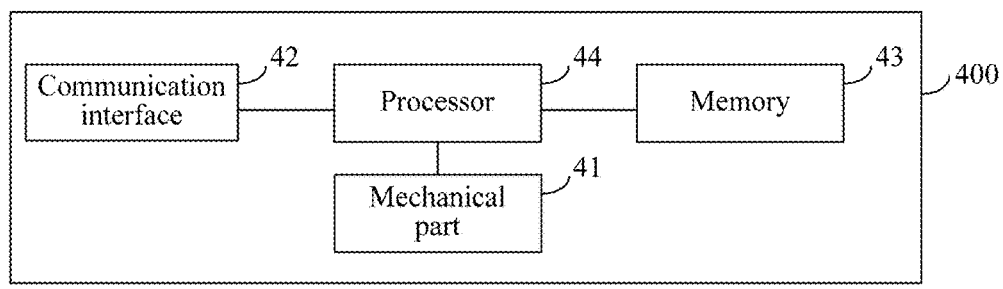
FIG. 14 is a schematic structural diagram of Embodiment 1 of an operation stick provided in the present application.

FIG. 14 is a schematic structural diagram of Embodiment 1 of an operation stick provided in the present application. As shown in FIG. 14, an operation stick 400 comprises:

a mechanical part 41, at least partially located between an end of the operation stick 400 and a first contact part, where the end is used to be in contact with an operation panel, the first contact part is used to be in contact with a partial limb of a user, and a physical property of the mechanical part 41 is controllable;

a communication interface 42, configured to communicate with at least one MR display device;

a memory 43, configured to store an instruction; and a processor 44, configured to execute the instruction stored in the memory 43, where the instruction causes the processor 44 to execute the following operations:

determining a height of an input position in three-dimensional display content displayed by the at least one MR display device, where the input position is selected by the user by controlling contact between the end and the operation panel by using the partial limb; and controlling the physical property of the mechanical part 41 at least according to the height.

In this embodiment, that the mechanical part 41 is at least partially located between an end of the operation stick 400 and the first contact part means that the mechanical part 41 is completely located between an end of the operation stick 400 and the first contact part, or, the mechanical part 41 is partially located between an end of the operation stick 400 and the first contact part. In a scenario in which the mechanical part 41 is partially located between an end of the operation stick 400 and the first contact part, another part of the mechanical part 41 is optionally located inside the first contact part, that is, a change of the physical property may also occur in a part, in contact with the partial limb, of the operation stick 400.

In this embodiment, the physical property of the mechanical part 41 can affect a straight-line distance between the end and the first contact part. Optionally, the physical property optionally comprises but not limited to at least one of the following: a physical length and a physical curvature.

In this embodiment, the communication interface 42 may communicate with the at least one MR display device by using any communication technology. For example, the communication interface 42 communicates with the at least one MR display device by using a BlueTooth (BT) technology.

In this embodiment, the memory 43 optionally comprises a high-speed RAM, and optionally further comprises a non-volatile memory, for example, at least one magnetic disk memory.

In this embodiment, the instruction optionally is stored in the memory 43 in the form of a program.

In this embodiment, the processor 44 may be a CPU, or an ASIC, or may be configured as one or more integrated circuits that execute the foregoing operations. For the foregoing operations that the processor 44 is caused by the instruction to execute, reference may be made to the corresponding description of the foregoing embodiment of the interaction method, and details are no longer described herein.

In this embodiment, the mechanical part 41 has multiple implementing manners.

Figure 15:
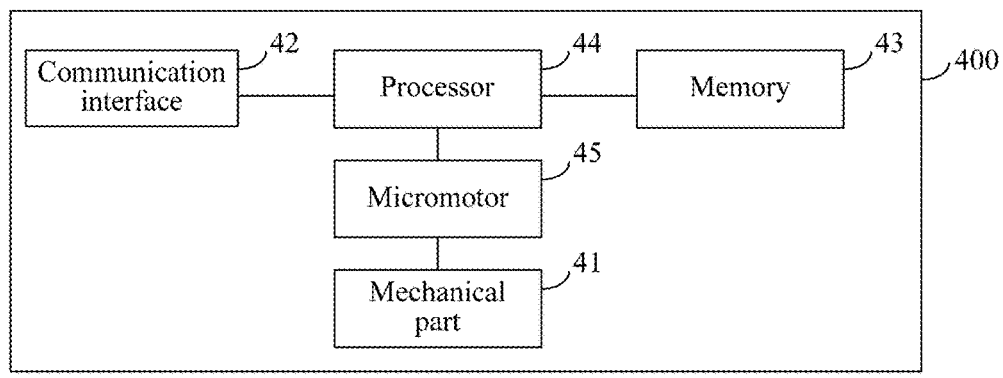
FIG. 15 to FIG. 17 are respectively schematic structural diagrams of implementing manners of the embodiment shown in FIG. 14.

In an optional implementing manner, the mechanical part 41 has a multi-section telescopic structure. As shown in FIG. 15, the operation stick 400 further comprises: a micromotor 45, configured to control the physical property of the mechanical part 41 under the control of the processor 44.

In this implementing manner, the multi-section telescopic structure is optionally formed of multi-section sleeve rods. The multi-section sleeve rods may sequentially extend or retract according to diameters. Specifically, extension and retraction of the multi-section sleeve rod are controlled by the micromotor.

In this implementing manner, the physical property is usually a physical length.

In another optional implementing manner, the mechanical part 41 is made of a material whose deformation is controllable.

The material whose deformation is controllable comprises but not limited to any of the following: an inverse piezoelectric material, an electroactive polymer (EAP) material, and a memory metal material.

In this implementing manner, control of the physical property of the mechanical part 41 by the processor 44 is implemented by controlling a shape of the mechanical part 41. Further, specifically how the processor 44 controls the shape of the mechanical part 41 depends on a material of which the mechanical part 41 is made. For example, if the mechanical part 41 is made of an inverse piezoelectric material or an EAP material, the processor 44 optionally controls an electric field applied on the mechanical part 41 to control the shape of the mechanical part 41. If the mechanical part 41 is made of a memory metal material, the processor 44 optionally controls a temperature of the mechanical part 41 to control the shape of the mechanical part 41. Further, the processor 44 may control a current that flows through the mechanical part 41 to control the temperature of the mechanical part 41.

In still another optional implementing manner, the mechanical part 41 is made of a material whose elasticity coefficient is controllable.

The material whose elasticity coefficient is controllable comprises but not limited to any of the following: an EAP material and a metal material.

In this implementing manner, the processor 44 may control an elasticity coefficient of the mechanical part 41 to control the physical property of the mechanical part 41. Further, in a process of controlling the elasticity coefficient of the mechanical part 41 by the processor 44, a force from the partial limb on the operation stick 400 usually needs to be considered.

Figure 16:
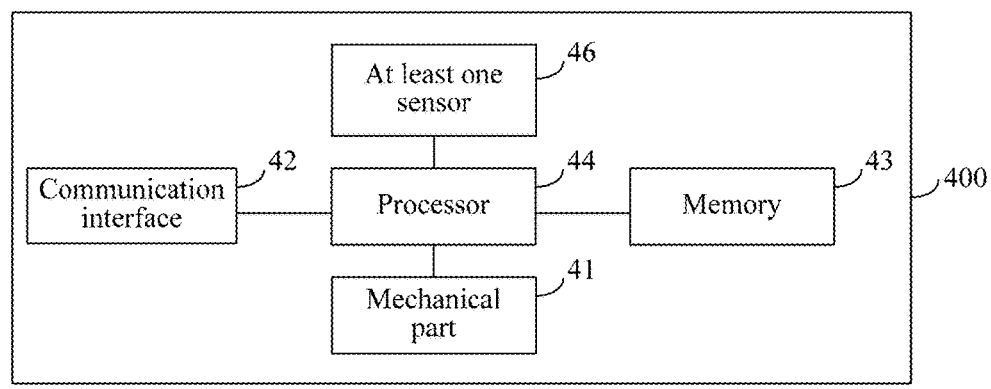

In this embodiment, optionally, as shown in FIG. 16, the operation stick 400 further comprises: at least one sensor 46, configured to detect a state of the operation stick 400.

Specifically, different types of sensors 46 may be used to detect states of different types of the operation stick 400.

In a possible scenario, at least one sensor 46 comprises: a gyroscope disposed at the first contact part, where the gyroscope is configured to detect an axial direction of the first contact part.

In still another possible scenario, at least one sensor 46 comprises: a photoelectric sensor disposed at the end, where the photoelectric sensor is configured to detect a movement of the end on the operation panel. Specifically, a working principle of the photoelectric sensor is similar to that of a photoelectric mouse, and details are no longer described herein.

In this embodiment, because the operation stick 400 is a tool for a user to perform input, at least one button is usually further disposed on the operation stick 400, and the at least one button may assist the user in performing input related setting.

Figure 17:
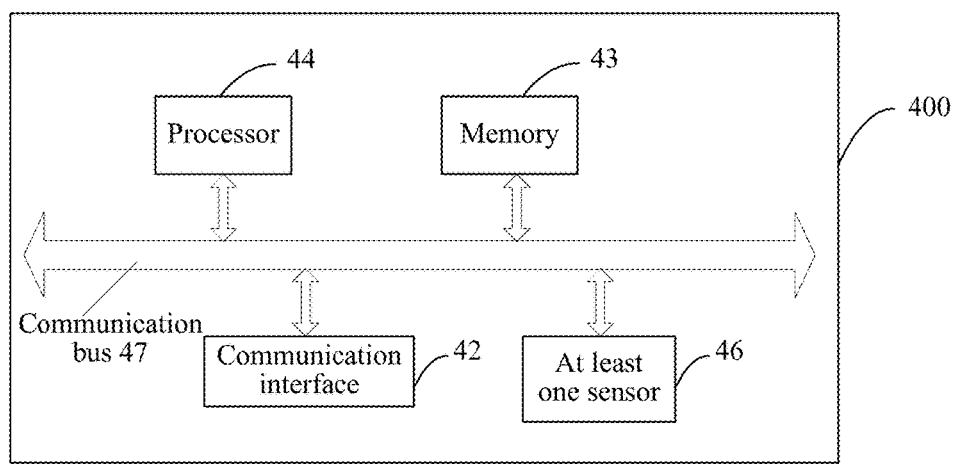

In this embodiment, communication and control between modules or units in the operation stick 400 are optionally implemented by using a communication bus. In an optional implementing manner, as shown in FIG. 17, the operation stick 400 further comprises: a communication bus 47.

Figure 18:
FIG. 18 is a brief diagram of a possible outline of the operation stick in the embodiment shown in FIG. 14.

FIG. 18 is a brief diagram of a possible outline of an operation stick in this embodiment. As shown in FIG. 18, the operation stick 400 has a pen form on the whole, and a concave portion is provided at a position above the middle portion of the operation stick to make it easy for the user to hold, that is, the first contact part is usually located at the concave portion. A light-color part between the concave portion and a pen tip is a controllable part of the physical property, that is, an area where the mechanical part 41 is located. On the basis of the outline shown in FIG. 18, the foregoing modules or units of the operation stick 400 may be disposed according to the following manner: a photoelectric sensor is disposed at a pen tip, and a gyroscope is disposed at a concave portion; and the communication interface 42, the memory 43, and the processor 44 are at least disposed between the mechanical part 41 and a top end.

Figure 19:
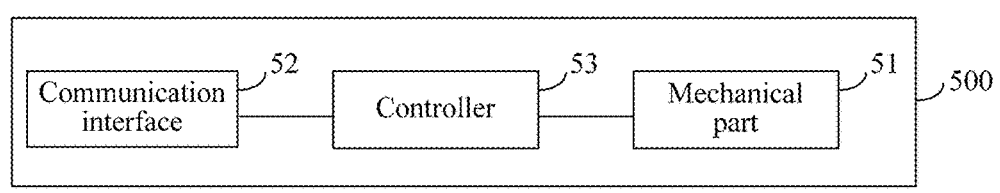
FIG. 19 is a schematic structural diagram of Embodiment 2 of an operation stick provided in the present application.

FIG. 19 is a schematic structural diagram of Embodiment 2 of an operation stick provided in the present application. As shown in FIG. 19, an operation stick 500 comprises:

a mechanical part 51, at least partially located between an end of the operation stick 500 and a first contact part, where the end is used to be in contact with an operation panel, the first contact part is used to be in contact with a partial limb of a user, and a physical property of the mechanical part 51 is controllable;

a communication interface 52, configured to receive a control instruction; and a controller 53, configured to control the physical property of the mechanical part 51 according to the control instruction.

In this embodiment, that the mechanical part 51 is at least partially located between an end of the operation stick 500 and the first contact part means that the mechanical part 51 is completely located between the end of the operation stick 500 and the first contact part, or, the mechanical part 51 is partially located at between the end of the operation stick 500 and the first contact part. In a scenario in which the mechanical part 51 is partially located between the end of the operation stick 500 and the first contact part, another part of the mechanical part 51 is optionally located inside the first contact part, that is, a change of the physical property may also occur in a part, in contact with the partial limb, on the operation stick 500.

In this embodiment, the physical property of the mechanical part 51 can affect a straight-line distance between the end and the first contact part. Optionally, the physical property optionally comprises but not limited to at least one of the following: a physical length and a physical curvature.

In this embodiment, the communication interface 52 may receive the control instruction from any external device, for example, receive the control instruction from the interaction device in Embodiment 2 of the interaction device provided in the present application. Further, the communication interface 52 may receive the control instruction by using any communication technology. For example, the communication interface 52 receives the control instruction by using a BT technology.

In this embodiment, the mechanical part 51 has multiple implementing manners.

In an optional implementing manner, the mechanical part 51 has a multi-section telescopic structure, and the controller 53 is a micromotor.

In this implementing manner, the multi-section telescopic structure is optionally formed of multi-section sleeve rods. The multi-section sleeve rods may sequentially extend or retract according to diameters. Specifically, extension and retraction of the multi-section sleeve rod is controlled by the micromotor.

In this implementing manner, the physical property is usually a physical length.

In another optional implementing manner, the mechanical part 51 is made of a material whose deformation is controllable.

The material whose deformation is controllable comprises but not limited to any of the following: an inverse piezoelectric material, an EAP material, and a memory metal material.

In this implementing manner, the controller 53 controls the physical property of the mechanical part 51 by controlling a shape of the mechanical part 51. Further, specifically how the controller 53 controls the shape of the mechanical part 51 depends on a material of which the mechanical part 51 is made. For example, if the mechanical part 51 is made of an inverse piezoelectric material or an EAP material, the controller 53 optionally controls an electric field applied on the mechanical part 51 to control the shape of the mechanical part 51. If the mechanical part 51 is made of a memory metal material, the controller 53 optionally controls a temperature of the mechanical part 51 to control the shape of the mechanical part 51. Further, the controller 53 may control a current that flows through the mechanical part 51 to control the temperature of the mechanical part 51.

In still another optional implementing manner, the mechanical part 51 is made of a material whose elasticity coefficient is controllable.

The material whose elasticity coefficient is controllable comprises but not limited to any of the following: an EAP material and a metal material.

In this implementing manner, the controller 53 may control an elasticity coefficient of the mechanical part 51 to control the physical property of the mechanical part 51. Further, in a process of controlling the elasticity coefficient of the mechanical part 51 by the controller 53, a force from the partial limb on the operation stick 500 usually needs to be considered.

In this embodiment, a possible outline of the operation stick 500 is shown in FIG. 18, and details are no longer described herein.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present invention.

If the functions are implemented in the form of a software functional unit and is sold or used as an independent product, it can be stored in a computer-readable storage medium. Based on such understanding, the technical solution of the present invention essentially or the part which contributes to the prior art or a part of the technical solution can be embodied in the form of a software product, and the computer software product is stored in a storage medium, and comprises several instructions for enabling a computer device (which can be a personal computer, a server, or network equipment, etc.) to execute all or some steps of the method described in each embodiment of the present invention. The foregoing storage medium comprises various media which can store a program code, such as a USB disk, a mobile hard disk, a read-only memory (ROM), a RAM, a magnetic disk or a compact disk.

The above implementations are only used to describe the present invention, without limiting the present invention; various alterations and variants can be made by those skilled in the art without departing from the spirit and scope of the present invention, so all equivalent technical solutions also belong to the scope of the present invention, and the scope of patent protection of the present invention should be defined by claims.

What is claimed is:

1. An interaction method, wherein the method comprises:
determining a height of an input position in three-dimensional display content, where the input position is selected by a user by controlling contact between an operation stick and an operation panel by using a partial limb; and
controlling a physical property of a first part between a first position in the operation stick and a first contact part at least according to the height, where the operation stick is in contact with the operation panel in the first position, and is in contact with the partial limb at the first contact part;
when the physical length of the first part changes, the display appearance of a second part stays unchanged, wherein the second part is between a second position in a first display object corresponding to the operation stick and a second contact part, and the first display object is in contact with the three-dimensional display content in the second position, and is in contact with a second display object corresponding to the partial limb at the second contact part.

2. The method of claim 1, wherein the height is a relative height of an operation position, mapped in real space, of the input position relative to the operation panel in a first axial direction, and the first axial direction is an axial direction of the first contact part on the operation stick.

3. The method of claim 2, wherein the controlling a physical property of a first part between a first position in the operation stick and a first contact part at least according to the height comprises:
determining a target distance between the partial limb and the operation panel in the first axial direction at least according to the height; and
controlling the physical property of the first part at least according to the target distance.

4. The method of claim 1, wherein before the determining a height of an input position in three-dimensional display content, the method further comprises:
determining the input position.

5. The method of claim 4, wherein the determining the input position comprises:

determining a three-dimensional area, mapped in the real space, of the three-dimensional display content at least according to the three-dimensional display content and a space mapping relationship between the real space and display space; and
determining that the input position is a display position, mapped in the display space, of a first intersection position between the first axial direction and the three-dimensional area in the real space.

6. The method of claim 5, wherein the method further comprises:
in response to that contact between the operation stick and the operation panel starts, calibrating the space mapping relationship.

7. The method of claim 4, wherein the determining the input position comprises:
determining that the input position is a second intersection position between a second axial direction and the three-dimensional display content in display space, where the second axial direction is an axial direction of the second contact part that is on the first display object and is in contact with the second display object corresponding to the partial limb.

8. The method of claim 1, wherein the physical property comprises at least one of the following: a physical length and a physical curvature.

9. The method of claim 8, wherein the controlling a physical property of a first part between a first position in the operation stick and a first contact part at least according to the height comprises:
in response to that the height increases, controlling the physical length of the first part to increase and/or controlling the physical curvature of the first part to decrease; and
in response to that the height decreases, controlling the physical length of the first part to decrease and/or controlling the physical curvature of the first part to increase.

10. The method of claim 1, wherein the method further comprises:
controlling a display appearance of the second part between the second position in the first display object corresponding to the operation stick and the second contact part to stay unchanged, where the first display object is in contact with the three-dimensional display content in the second position, and is in contact with the second display object corresponding to the partial limb at the second contact part.

11. The method of claim 10, wherein the display appearance comprises: an apparent length and an apparent curvature.

12. An interaction device, wherein the device comprises:
a first determining module, configured to determine a height of an input position in three-dimensional display content, where the input position is selected by a user by controlling contact between an operation stick and an operation panel by using a partial limb; and
a first control module, configured to control a physical property of a first part between a first position in the operation stick and a first contact part at least according to the height, where the operation stick is in contact with the operation panel in the first position, and is in contact with the partial limb at the first contact part;
when the physical length of the first part changes, the display appearance of a second part stays unchanged, wherein the second part is between a second position in a first display object corresponding to the operation stick and a second contact part, and the first display object is in contact with the three-dimensional display content in the second position, and is in contact with a second display object corresponding to the partial limb at the second contact part.

13. The device of claim 12, wherein the height is a relative height of an operation position, mapped in real space, of the input position relative to the operation panel in a first axial direction, and the first axial direction is an axial direction of the first contact part on the operation stick.

14. The device of claim 13, wherein the first control module comprises:
a first determining unit, configured to determine a target distance between the partial limb and the operation panel in the first axial direction at least according to the height; and
a control unit, configured to control the physical property of the first part at least according to the target distance.

15. The device of claim 12, wherein the device further comprises: a second determining module, configured to determine the input position.

16. The device of claim 15, wherein the second determining module comprises:
a second determining unit, configured to determine a three-dimensional area, mapped in the real space, of the three-dimensional display content at least according to the three-dimensional display content and a space mapping relationship between the real space and display space; and
a third determining unit, configured to determine that the input position is a display position, mapped in the display space, of a first intersection position between the first axial direction and the three-dimensional area in the real space.

17. The device of claim 16, wherein the second determining module further comprises: a space calibration unit, configured to: in response to that contact between the operation stick and an operation surface starts, calibrate the space mapping relationship.

18. The device of claim 15, wherein the second determining module comprises: a fourth determining unit, configured to determine that the input position is a second intersection position between a second axial direction and the three-dimensional display content in display space, where the second axial direction is an axial direction of the second contact part that is on the first display object and is in contact with the second display object corresponding to the partial limb.

19. The device of claim 12, wherein the physical property comprises at least one of the following: a physical length and a physical curvature.

20. The device of claim 19, wherein the first control module is specifically configured to:
in response to that the height increases, control the physical length of the first part to increase and/or control the physical curvature of the first part to decrease; and
in response to that the height decreases, control the physical length of the first part to decrease and/or control the physical curvature of the first part to increase.

21. The device of claim 12, wherein the device further comprises: a second control module, configured to control a display appearance of the second part between the second position in the first display object corresponding to the operation stick and the second contact part to stay unchanged, where the first display object is in contact with the three-dimensional display content in the second position, and is in contact with the second display object corresponding to the partial limb at the second contact part.

22. The device of claim 21, wherein the display appearance comprises: an apparent length and an apparent curvature.

23. An interaction device, wherein the device comprises:
a communication interface, configured to communicate with at least one mixed reality (MR) display device and an operation stick;
a memory, configured to store an instruction; and
a processor, configured to execute the instruction stored in the memory, where the instruction causes the processor to execute the following operations:
determining a height of an input position in three-dimensional display content displayed by the at least one MR display device, where the input position is selected by a user by controlling contact between the operation stick and an operation panel by using a partial limb; and
sending a control instruction to the operation stick at least according to the height, where the control instruction is used to control a physical property of a first part between a first position in the operation stick and a first contact part, and the operation stick is in contact with the operation panel in the first position, and is in contact with the partial limb at the first contact part;
when the physical length of the first part changes, the display appearance of a second part stays unchanged, wherein the second part is between a second position in a first display object corresponding to the operation stick and a second contact part, and the first display object is in contact with the three-dimensional display content in the second position, and is in contact with a second display object corresponding to the partial limb at the second contact part.

24. The device of claim 23, wherein the device further comprises: a camera, configured to acquire at least one monitoring image of the operation stick and the operation panel; and
the instruction causes the processor to further execute the following operation:
determining the input position at least according to the three-dimensional display content and the at least one monitoring image.

25. The device of claim 23, wherein the physical property comprises at least one of the following: a physical length and a physical curvature.

26. An operation stick, wherein the operation stick comprises:
a mechanical part, at least partially located between an end of the operation stick and a first contact part, where the end is used to be in contact with an operation panel, the first contact part is used to be in contact with a partial limb of a user, and a physical property of the mechanical part is controllable;
a communication interface, configured to communicate with at least one mixed reality (MR) display device;
a memory, configured to store an instruction; and
a processor, configured to execute the instruction stored in the memory, where the instruction causes the processor to execute the following operations:
determining a height of an input position in three-dimensional display content displayed by the at least one MR display device, where the input position is selected by the user by controlling contact between the end and the operation panel by using the partial limb; and controlling the physical property of the mechanical part at least according to the height;
wherein before determining a height of an input position in three-dimensional display content, the method further comprises: determining the input position;
wherein the determining the input position comprises:
determining a three-dimensional area, mapped in the real space, of the three-dimensional display content at least according to the three-dimensional display content and a space mapping relationship between the real space and display space; and
determining that the input position is a display position, mapped in the display space, of a first intersection position between the first axial direction and the three-dimensional area in the real space.

27. The operation stick of claim 26, wherein the operation stick further comprises: at least one sensor, configured to detect a state of the operation stick.

28. The operation stick of claim 27, wherein the at least one sensor comprises: a gyroscope disposed at the first contact part, where the gyroscope is configured to detect an axial direction of the first contact part.

29. The operation stick of claim 27, wherein the at least one sensor comprises: a photoelectric sensor disposed at the end, where the photoelectric sensor is configured to detect a movement of the end on the operation panel.

30. The operation stick of claim 26, wherein the mechanical part has a multi-section telescopic structure, and the operation stick further comprises: a micromotor, where the micromotor is configured to control, under the control of the processor, a physical property of the multi-section telescopic structure.

31. The operation stick of claim 26, wherein the mechanical part is made of a material whose deformation is controllable.

32. The operation stick of claim 31, wherein the material whose deformation is controllable comprises any of the following: an inverse piezoelectric material, an electroactive polymer (EAP) material, and a memory metal material.

33. The operation stick of claim 26, wherein the mechanical part is made of a material whose elasticity coefficient is controllable.

34. The operation stick of claim 33, wherein the material whose elasticity coefficient is controllable comprises any of the following: an EAP material and a metal material.

35. The operation stick of claim 26, wherein the physical property comprises at least one of the following: a physical length and a physical curvature.

36. An operation stick, wherein the operation stick comprises:
a mechanical part, at least partially located between an end of the operation stick and a first contact part, where the end is used to be in contact with an operation panel, the first contact part is used to be in contact with a partial limb of a user, and a physical property of the mechanical part is controllable;
a communication interface, configured to receive a control instruction; and
a controller, configured to perform the following operations according to the control instruction:
determining a three-dimensional area, mapped in the real space, of the three-dimensional display content at least according to the three-dimensional display content and a space mapping relationship between the real space and display space; and
determining that the input position is a display position, mapped in the display space, of a first intersection position between the first axial direction and the three-dimensional area in the real space;
determining a height of an input position in three-dimensional display content displayed by the at least one MR display device, where the input position is selected by the user by controlling contact between the end and the operation panel by using the partial limb; and
controlling the physical property of the mechanical part at least according to the height.

37. The operation stick of claim 36, wherein the mechanical part has a multi-section telescopic structure, the controller is a micromotor.

38. The operation stick of claim 36, wherein the mechanical part is made of a material whose deformation is controllable.

39. The operation stick of claim 38, wherein the material whose deformation is controllable comprises any of the following: an inverse piezoelectric material, an electroactive polymer (EAP) material, and a memory metal material.

40. The operation stick of claim 36, wherein the mechanical part is made of a material whose elasticity coefficient is controllable.

41. The operation stick of claim 40, wherein the material whose elasticity coefficient is controllable comprises any of the following: an EAP material and a metal material.

42. The operation stick of claim 36, wherein the physical property comprises at least one of the following: a physical length and a physical curvature.

* * * * *